United States Patent Office 3,827,887

Patented Aug. 6, 1974

3,827,887

STORAGE STABILITY OF NONSILVER PHOTOSENSITIVE SYSTEMS BY INCORPORATING THEREIN CERTAIN ORGANIC N-OXIDES

Andrew C. Hazy, Mentor, John E. Shirey, Bedford Heights, and Lothar Ramins, Cleveland, Ohio, assignors to Horizons Incorporated, a Division of Horizons Research Incorporated, Cleveland, Ohio

No Drawing. Filed Oct. 10, 1972, Ser. No. 295,834
Int. Cl. G03c *1/52, 5/24*
U.S. Cl. 96—480 P 14 Claims

ABSTRACT OF THE DISCLOSURE

Storage stability, especially resistance to atmospheric moisture of non-silver photosensitive compositions such as those described in U.S. 3,481,739 and similar non-silver free radical compositions, is improved by the addition thereto of certain organic nitrogen compounds containing an N→O group.

This invention relates to photosensitive compositions and to photosensitive films based on such compositions. More particularly, it relates to the improvement of the storage stability of such photosensitive compositions by the addition thereto of at least one organic nitrogen compound represented by one of the following generic formulas:

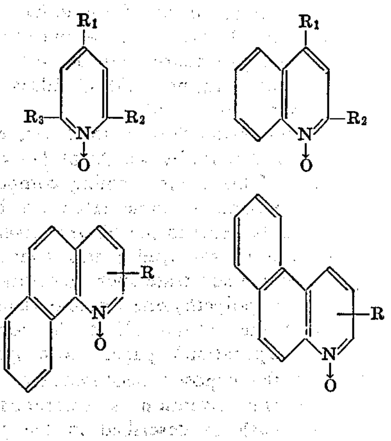

wherein $R_1$, $R_2$ and $R_3$ each represent H, aryl or substituted aryl and may be the same or different provided that at least one of $R_1$, $R_2$ and $R_3$ is aromatic, and wherein R may be H, alkyl, aryl, arylalkyl or substituted aryl.

The use of organic N→O compounds for improving the photographic speed of nonsilver films is described in U.S. Pat. 3,481,739. While the improved response thus obtained was certainly desirable, these films have been found to be susceptible to moisture and films stored under conditions of high humidity have exhibited surface "blush" resulting in loss of transparency.

It has been found that aromatic amine N-oxides of the formulas shown above when incorporated into nonsilver photosensitive compositions not only improve the speed of such compositions but also increase dramatically their resistance to moisture.

The photosensitive compositions to which the present invention is particularly applicable include non-silver photosensitive compositions comprising an amine, styryl, cyanine or merocyanine dye base, other leuco di- or triphenyl methane compound, or aminoaryl ethylene compound and an activator, usually organic halogen compound or a sulfur containing compound as described in the following U.S. Patents, among others:

| | |
|---|---|
| Amines | 3,042,515; 3,147,117. |
| Styryl and cyanine dye bases | 3,110,703; 3,102,810; 3,095,303. |
| Merocyanine dye bases | 3,109,736. |
| Leuco di- and triphenylmethane compounds. | 3,121,632. |
| Ethylene compounds | 3,510,304; 3,533,792. |
| Organic halogen compounds | 3,042,515; 3,147,117. |
| Sulfur containing compounds | 3,285,744. |
| Sulfur and halogen containing compounds. | 3,113,024. |

The disclosures of said patents are intended to be incorporated herein by reference. The compounds enumerated below are representative of specific compounds within the above classes and are intended to be illustrative and are not to be considered a complete listing of all of those which are suitable for the present invention:

(1) COLOR FORMING COMPOUNDS

(a) Amines

Amines described in U.S. Pat. 3,042,515 are those described by the formula

wherein R is an aryl nucleus such as benzene, naphthalene or anthracene. The nucleus may be either unsubstituted or substituted with e.g. alkyl, halogen or aryl groups and X and Y are each selected from the group consisting of alkyl, arylalkyl, aryl, halogen and hydrogen and may be the same or different. Aniline, diphenylamine, *o*-toluidine, leuco crystal violet, leuco malachite green, and similar amines, or mixtures of two or more of such amines have been found to be suitable.

(b) Styryl and Cyanine Dye Bases

Suitable styryl and cyanine dye bases include 2- and 4-(*p*-dimethylaminostyryl) quinoline, 2- and 4-(*p*-diethylaminostyryl quinoline, 2- and 4-[4-p-dimethylaminophenyl]-butadienyl quinoline and 2-(3-ethyl-2(3H)benzothiazolylidene)-propenyl benzothiazole.

(c) Merocyanine Dye Bases

Merocyanine dye bases which have been found suitable in the compositions of this invention include those described in U.S. Pat. 3,109,736 and others of a similar nature.

(d) Di- and Tri-phenyl Methane Compounds

Di- and tri-phenyl methane compounds most suitable for this invention are the leuco bases of di- and tri-phenyl methane dyes such as leuco crystal violet, leuco opal blue, leuco malachite green, leuco methyl violet, leuco *p*-rosaniline, leuco Victoria blue and others of a similar nature.

In addition to theabove named leuco compounds in which a central carbon atom is present to which two or three aryl groups are attached or which forms a portion of a heterocyclic ring in fused ring compounds such as xanthenes, thioxanthenes, acridines, dihydroanthracenes and the like, it is intended to include alkyl ethers and allyl ethers of such compounds within the context of the expression "leuco compound."

(e) Ethylene Compounds

Suitable ethylene compounds are those described in U.S. Pats. 3,510,304 and 3,533,792 which may be represented by the formula

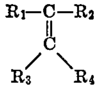

wherein $R_1$ and $R_2$ are each a monovalent radical represented by the formula

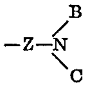

in which Z is selected from the group consisting of phenyl, naphthyl and diphenyl, and in which B and C are each selected from the group consisting of H and alkyl and wherein $R_3$ and $R_4$ are each selected from the group consisting of H, alkyl and aryl.

(2) ACTIVATORS

(a) Organic Halogen Compounds

The organic halogen compounds which are suitable in the light sensitive compositions to which the present invention is applicable include those represented by the general formula A—C—$X_3$ wherein A represents halogen (Cl, Br or I), alkyl, substituted alkyl including halogen substituted alkyl, aryl, substituted aryl, aroyl, and arylalkyl and wherein each X represents a halogen atom which may be either chlorine, bromine, or iodine, it being understood that not all of the X atoms need be alike. Preferred compounds are halogen substituted alkanes, e.g. $CBr_4$, $CHI_3$, $C_2HBr_5$, $CI_4$, etc., and α,α,α-tribromoacetophenone.

(b) Sulfur Containing Compounds

The sulfur containing compounds which are suitable in the photosensitive compositions to which the present invention is applicable are those represented by either the formula R—SH or the formula R—S—S—R wherein each R represents an aryl or heterocyclic ring. Suitable compounds include 2-mercaptobenzothiazole, 5-methoxy-2-mercaptobenzothiazole, 1 - phenyl-5-mercaptotetrazole and pentachlorobenzenethio-bis(dimethyl - thiocarbonyl) disulfide.

(c) Sulfur and Halogen Containing Compounds

Activator compounds containing both halogen and sulfur and which are suitable for the present invention include the sulfonyl and sulfenyl halides described in U.S. Pat. 3,113,024, e.g., 2,4-dinitrobenzenesulfonyl chloride, *p*-chlorobenzenesulfonyl chloride, *o*-nitrobenzenesulfenyl chloride and pentachlorobenzenesulfenyl chloride.

(3) BINDER

As described in the above noted patents, the photosensitive compositions are preferably formulated with a film forming binder and are cast as a thin film from solution usually as a thin coating on a suitable substrate. Among the binders which can be used are solutions of polystyrene, copolymers of styrene and acrylonitrile, polyphenylene oxide, polycarbonate, polyvinylbutyral, suitable combinations of the above, and others such as those described in U.S. Pats. 3,100,703 and 3,147,117. The compositions have been utilized without a binder, for example, when imbibed in a paper or other porous substrate.

(4) ADDITIONAL CONSTITUENTS

Many compounds which have been added to the aforementioned photosensitive compositions are fully described in the above noted patents, including compounds to sensitize the compositions to certain wavelengths of light, stabilizers to permit storage of the compositions, additives to modify the color of the image produced by exposure to light, and additives which facilitate fixing of the compositions after exposure. The present invention is applicable to compositions including one or more of such additives.

(5) The N→O COMPOUNDS

The N→O compounds, the use of which comprises the present invention are those represented by one of the following general formulas:

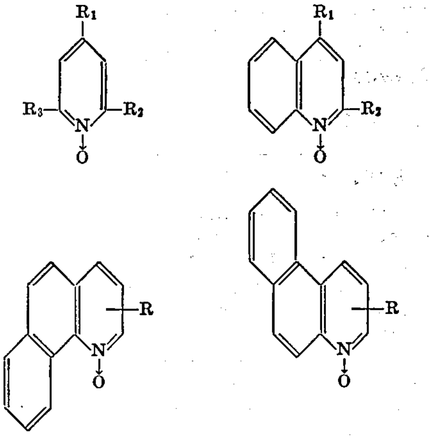

where $R_1$, $R_2$ and $R_3$ are each selected from the group consisting of H, aryl and substituted aryl and at least one of $R_1$, $R_2$ and $R_3$ must be aromatic; and R may be H, alkyl, aryl, arylalkyl or substituted aryl.

Examples of N→O compounds which have been found suitable include: 2- or 4-phenylpyridine N-oxide, 2,4-diphenylpyridine N - oxide, 4-*p*-toluylpyridine N-oxide, 4-phenylquinoline N-oxide, benzo (f)quinoline N-oxide and benzo (h)quinoline N-oxide. These materials may be prepared by known procedures e.g. as described by Eiji Ochiai in "Aromatic Amine Oxides," Elsevier Publishing Company, New York, 1967.

Proportions: Suitable proportions of the N-oxides range from 0.1 part to up to 2 parts by weight of N-oxide, for each part by weight of the color forming compound in the composition and depends to some extent on the solubility of the particular N-oxide in the binder-solvent used.

Base: The formulations employed in this invention can be applied to any suitable substrate such as cellulose acetate, polyesters such as polyethylene terephthalate as defined by the trade names Mylar (E. I. du Pont) and Celanar (Celanese Corporation), paper, cloth, glass, etc.

Fixing: Fixing of the exposed photosensitive compositions employed in this invention is accomplished by heat or by solvent wash as described in the previous patents.

EXAMPLES

The following examples are illustrative of the ways in which the compounds referred to in this invention were used and are not intended as limitative thereof. The sensitometric properties of films prepared from formulations incorporating the N-oxides of this invention are essentially the same as those described for the films containing other N-oxides as disclosed in the U.S. Pat. 3,481,739, but the films exhibit a greatly improved storage stability as compared to the films described in said patent.

Example 1

A solution of 1.4 g. of carbon tetrabromide, 100 mg. of leuco crystal violet and 15 mg. of 4-picoline N-oxide in 4 cc. of a 10% solution of polystyrene in benzene was coated on a polyester substrate and allowed to dry. The clear dried coating was suspended in a sealed container over water and allowed to stand for 24 hours after which time the film was blushed and was no longer transparent. An otherwise identical coating was prepared using 15 mg. of 2-phenylpyridine N-oxide instead of the 4-picoline N-oxide. After storage for 24 hours under identical conditions of high humidity, the resulting film was still completely transparent and useful as a photographic product.

Example 2

A film was prepared from a solution containing 70 mg. of 1,1-bis(4-dimethylaminophenyl)ethylene, 280 mg. of iodoform, 200 mg. of 2,6-di-*t*-butyl-*p*-cresol, 15 mg. of triphenyl stibene, 12 mg. of 4-aminoantipyrine, 12 mg. of acetoacetanilide and 24 mg. of 4-ethylpyridine N-oxide in 6 cc. of a 12.5% solution of polyphenylene oxide in trichloroethylene. The coating was prepared on polyester substrate and dried at 90° C. for 2 minutes. An identical film was prepared except that 24 mg. of 4-phenylpyridine N-oxide was used instead of the 4 ethyl-pyridine N-oxide. Both films were maintained in the high humidity conditions described in Example 1 for 24 hours. The film containing the 4-phenylpyridine N-oxide was entirely transparent while the film containing 4-ethylpyridine N-oxide was severely blushed.

For comparison purposes, additional samples of each of these films were prepared and stored in the dark at ambient conditions of humidity. After 2 months of storage, the film containing 4-ethylpyridine N-oxide was no longer transparent, while the film containing 4-phenylpyridine N-oxide was still perfectly clear.

Example 3

The films described in Example 2 were prepared from the same formulations except that the binder employed was a 10% solution of polycarbonate in methylene chloride. The film containing 4-ethylpyridine N-oxide blushed after storage under high humidity while the film containing 4-phenylpyridine N-oxide remained transparent.

Examples 4 and 5

The formulations described in Example 2 were prepared in a polystyrene binder and in a binder containing a blend of polystyrene and polyphenylene oxide. Both films containing 4-phenylpyridine N-oxide remained clear while the films with the 4-ethylpyridine N-oxide blushed after being subjected to high concentrations of atmospheric moisture.

Examples 6–9

The films described in Examples 2–5 were prepared using benzo(f)quinoline N-oxide as the N-oxide ingredient. All of these films were transparent after 24 hours storage in the sealed container of water.

Examples 10–13

The formulations of Examples 2–5 were prepared using benzo(h)quinoline N-oxide as the N-oxide. Each of these films showed similar resistance to moisture during storage.

Example 14

A solution of 100 mg. of 4-(*p*-diethylaminostyryl)-quinoline, 100 mg. of 2,6-di-*t*-butyl-*p*-cresol, 300 mg. of iodoform and 50 mg. of 4-ethylpyridine N-oxide in 6 cc. of 10% polyvinylbutyral in a mixture of 3:1 methylene chloride-chlorobenzene was coated on a polyester substate and allowed to dry. An otherwise identical coating was made using 50 mg. of benzo(f)quinoline N-oxide instead of the 4-ethylpyridine N-oxide. Both coatings were suspended over water in a sealed container for 24 hours.

The film containing the benzo(f)quinoline N-oxide was clear while the other film was particularly opaque.

Example 15

A mixture of 100 mg. of leuca malachite green, 100 mg. of 2,6-di-*t*-butyl-*p*-cresol, 1.4 g. of carbon tetrabromide and 20 mg. of 4-picoline N-oxide was dissolved in 6 cc. of 10% polystyrene solution in a mixture of 3 parts toluene and 2 parts methyl ethyl ketone and coated on a polyester substrate. Another film was made in which the 4-picoline N-oxide was replaced by benzo(h)quinoline N-oxide. After storage under high humidity, the film containing the benzo(h)quinoline N-oxide was transparent while the film with 4-picoline N-oxide was blushed.

Example 16

Films were prepared as in Example 1 except that the color former was 2,7-bis(dimethylamino)-10(*p*-dimethylaminophenyl) - 9,10-di-hydro-9,9-dimethylanthracene, instead of leuco crystal violet. Similar results were obtained.

Examples 17–24

A series of non-photosensitive films was prepared from a variety of binders using only the binder solution and an N-oxide in each. The N-oxide chosen as being representative of the compounds useful for this invention was 4-phenylpyridine N-oxide and the compound selected for comparison was 4-picoline N-oxide. Films were prepared from the following binders: polystyrene, poly(styrene-acrylonitrile), polyphenylene oxide, cellulose acetate, polycarbonate, polyvinylbutyral, polyvinylchloride, and poly(methyl methacrylate). Each of the films containing 4-phenylpyridine N-oxide remained transparent after storage for 24 hours under high humidity, while all of the films containing the picoline N-oxide were blushed after identical storage.

We claim:

1. A photosensitive composition comprising:

(a) at least one color forming compound selected from the group consisting of leuco di- and tri-phenylmethane compounds, leuco dihydroanthracenes, leuco dye bases, styryl and cyanine dye bases, merocyanine dye bases, amines described by the formula

wherein R is an aryl nucleus selected from the group consisting of benzene, naphthalene and anthracene and is either unsubstituted or substituted with alkyl, halogen, or aryl groups, and X and Y are each selected from the group consisting of alkyl, arylalkyl, halogen and hydrogen and may be the same or different; and compounds represented by the general formula

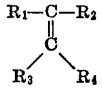

wherein $R_1$ and $R_2$ are each a monovalent radical represented by the formula

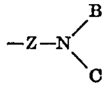

in which Z is selected from the group consisting of phenyl, naphthyl and diphenyl, and in which B and C are each selected from the group consisting of H and alkyl and wherein $R_3$ and $R_4$ are each selected from the group consisting of H, alkyl and aryl;

(b) at least one activator for accelerating the change in said color forming compound, produced as a result of exposure to a suitable dose of radiation from the original compound to a product having a different color, said activator being selected from the group consisting of organic halogen compounds in which at least three halogen atoms are attached to a single carbon atom, said halogen atoms being selected from the group consisting of Cl, Br and I, organic sulfur compounds represented by the generic formula RSH wherein R represents an aryl or heterocyclic ring, sulfides represented by the formula RSSR wherein R represents an aryl or heterocyclic ring, sulfonyl halides and sulfenyl halides; and (c) at least one organic N→O compound in sufficient amount to further accelerate the change to said product directly as a result of said exposure to said dose of radiation and also to increase the storage stability, particularly by increasing the resistance to moisture and high humidity, of the photosensitive composition; and wherein the N→O compound is selected from the group consisting of compounds represented by one of the general formulas

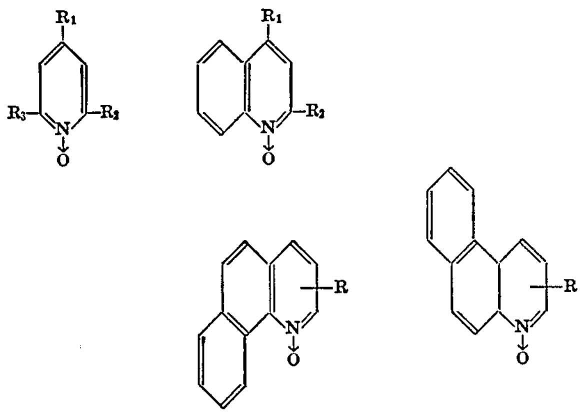

wherein $R_1$, $R_2$ and $R_3$ each represent H or aryl and the groups may be the same or different provided that at least one of the groups is aryl, and R represents H.

2. The composition of Claim 1 as a photosensive film in a polymeric binder carrier which supports the mixture of (a), (b) and (c).

3. The composition of Claim 1 wherein the N→O compounds is represented by the general formula

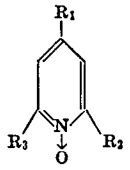

wherein $R_1$, $R_2$ and $R_3$ represent H, aryl or substituted aryl and the groups may be the same or different provided that at least one of the groups is aryl.

4. The composition of Claim 1 wherein the N→O compound is represented by the general formula

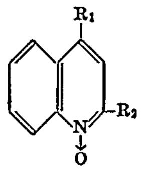

wherein $R_1$ and $R_2$ each represent H, aryl or substituted aryl and the groups may be the same or different provided that at least one of the groups is aryl.

5. The composition of Claim 1 wherein the N→O compound is represented by the formula

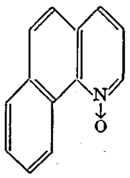

6. The composition of Claim 1 wherein the N→O compound is represented by the formula

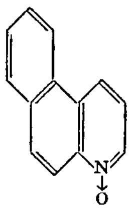

7. The composition of Claim 1 wherein the activator is at least one compound represented by the general formula Q—C—$X_3$ wherein Q represents a monovalent radical selected from the group consisting of hydrogen, halogen, alkyl, substituted aryl, aroyl and arylalkyl and each X represents a halogen atom selected from the group consisting of chlorine, bromine, and iodine and all of the X's need not be the same.

8. The composition of Claim 7 wherein the activator is a bromine substituted alkane.

9. The composition of Claim 7 wherein the activator is an iodine substituted alkane.

10. The composition of Claim 1 wherein the activator is a sulfur containing organic compound represented by a general formula RSH wherein R represents a ring selected from the group consisting of carbocyclic and heterocyclic rings.

11. The composition of Claim 10 wherein the activator is a mercaptobenzothiazole.

12. The composition of Claim 1 wherein there are between 0.1 and 2 parts by weight of N→O compound for each part by weight of color forming compound.

13. The composition of Claim 3 wherein the N→O compound is 4-phenylpyridine N-oxide.

14. The process which comprises preparing the composition of Claim 1 in a thin dry layer and thereafter photographically exposing said composition to a suitable dosage of radiation, whereby a color change occurs in the exposed portions of said layer, directly as a result of said exposure.

References Cited

UNITED STATES PATENTS

| | | | |
|---|---|---|---|
| 3,481,739 | 12/1969 | Wainer et al. | 96—90 R |
| 3,582,342 | 6/1971 | Itano et al. | 96—90 R |
| 3,510,309 | 5/1970 | Lewis | 96—90 R |

RONALD H. SMITH, Primary Examiner
W. H. LOUIE, JR., Assistant Examiner

U.S. Cl. X.R.

96—90 R